United States Patent [19]

Graves et al.

[11] 3,882,406
[45] May 6, 1975

[54] FAULT SUPPRESSING SIGNAL SELECTION APPARATUS

[75] Inventors: Harry C. Graves, Minneapolis, Minn.; Brian E. Horne, Cheltenham, England

[73] Assignee: Honeywell, Inc., Minneapolis, Minn.

[22] Filed: Nov. 14, 1973

[21] Appl. No.: 415,775

[52] U.S. Cl. ........ 328/150; 328/147; 340/146.1 BA; 235/153 AE
[51] Int. Cl. .......................................... H03k 17/00
[58] Field of Search ......... 340/146.1 BA, 146.1 BE; 235/153 AE, 153 AH; 318/564; 307/219; 328/235, 150, 147

[56] References Cited
UNITED STATES PATENTS

| | | | |
|---|---|---|---|
| 3,422,327 | 1/1969 | McBrayer et al. | 318/564 |
| 3,596,107 | 7/1971 | Kittrell | 307/235 |
| 3,665,173 | 5/1972 | Bouricius et al. | 235/153 AE |
| 3,688,099 | 8/1972 | Buscher | 235/153 AE |
| 3,805,235 | 4/1974 | Foster et al. | 235/153 AE |

*Primary Examiner*—Michael J. Lynch
*Assistant Examiner*—B. P. Davis

[57] ABSTRACT

A fail operational/fail passive automatic pilot system for controlling or positioning a control surface of an aircraft is disclosed. This system utilizes two computer assemblies, each including two redundant computation channels. The four computation channels receive signals from fail operational/fail passive sensor sets made up of two monitored and three unmonitored sensors. Each computation channel generates a redundant channel signal which is crossfed to each of four signal selectors. The signal selectors select signals for controlling and monitoring system operation. Failure logic associated with each signal selector suppresses sensor and system faults to achieve fail operational/fail passive system operation.

8 Claims, 10 Drawing Figures

FAILURE LOGIC SWITCHING

SIGNAL SELECTOR

POSSIBLE COMBINATIONS OF CHANNEL SIGNAL POLARITY

CHANNEL SIGNAL VOLTAGE POLARITY

CHANNEL SIGNAL SELECTED BY SIGNAL SELECTORS DURING NORMAL OPERATION IS CIRCLED

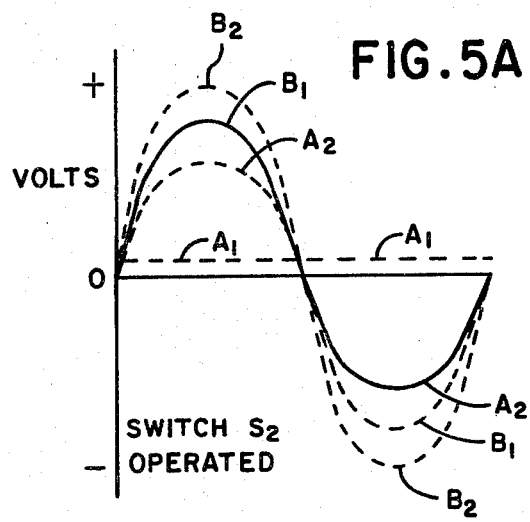
FIG. 5A — SWITCH S₂ OPERATED
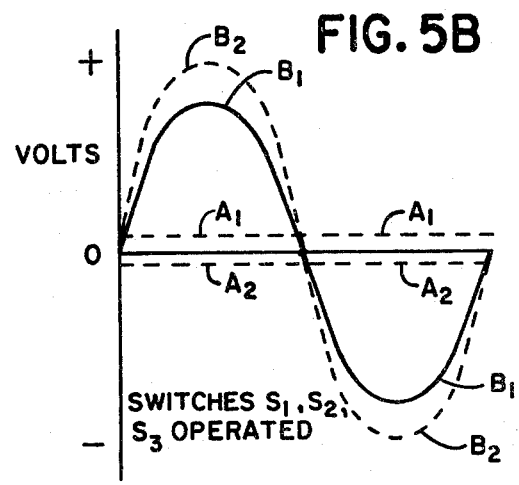
FIG. 5B — SWITCHES S₁, S₂, S₃ OPERATED
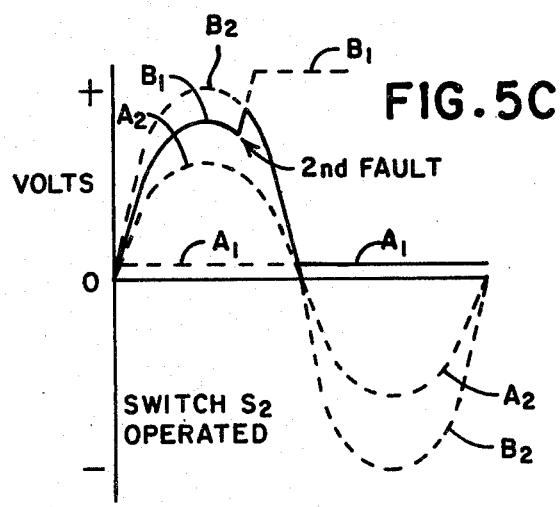
FIG. 5C — SWITCH S₂ OPERATED
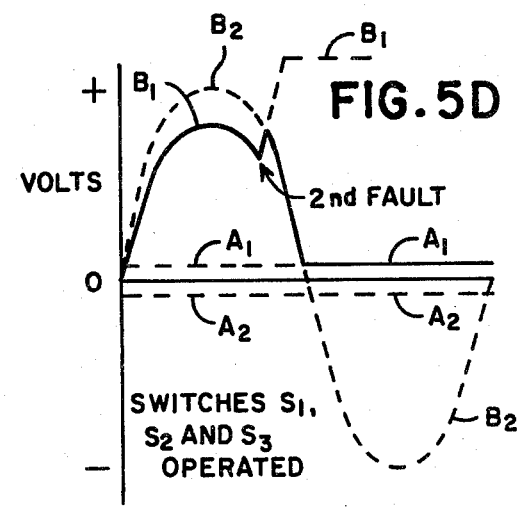
FIG. 5D — SWITCHES S₁, S₂ AND S₃ OPERATED
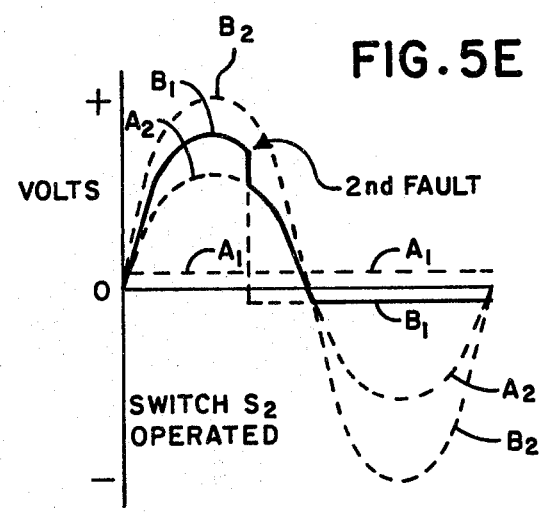
FIG. 5E — SWITCH S₂ OPERATED
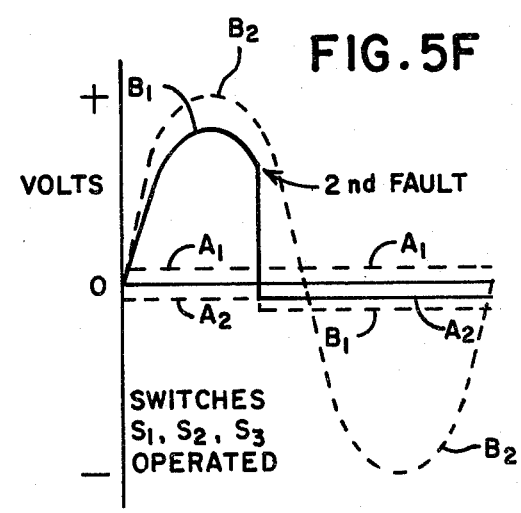
FIG. 5F — SWITCHES S₁, S₂, S₃ OPERATED

FAULT SUPPRESSING SIGNAL SELECTION APPARATUS

BACKGROUND OF THE INVENTION

This invention is in the general field of redundant logic circuits. More specifically, it is a fault suppressing signal selection circuit developed for use in circuit applications requiring fail operational/fail passive capability.

A problem often encountered in designing control systems is system reliability requirements which exceed the reliability attainable by use of a single component for each function the system performs. This problem is sometimes approached using a plurality of elements, each of which is capable of performing the same function, and designing logic circuitry which detects element faults and selects an unfailed element output for use by the system. The plurality of identical elements, and the signals they produce, are referred to as "redundant" since only one unfailed element and signal is actually required for each system function. The result of this design approach is achievement of either fail passive or fail operational/fail passive capability.

As used in this specification, the term "fail operational/fail passive" refers to a mode of operation in which a system or portion thereof tolerates a first failure without significant transients or loss of proper function and, upon second failure, assumes a passive state. The assumption of a passive state upon second failure permits a human operator to take over control of the system without encountering transient signal problems. The term "fail passive" as used herein, refers to a mode of operation in which a system or portion thereof assumes a passive state after a first failure. The purpose of a fail passive mode in both fail operational/fail passive and fail passive systems is to facilitate manual operation when the system no longer provides control. The term "passive", as applied herein to signals and states, denotes signals and states which result in no change in the existing condition controlled by the system and do not hinder manual operation.

Monitored elements, are elements which are each monitored by another element or contain a built-in monitor which generates a validity signal during proper element operation. Two identical monitored elements are required to obtain fail operational/fail passive capability in the portion of the system including the elements. The first monitored element fault will be accompanied by loss of that element's validity signal. This may be utilized by system logic to dictate selection of the other element's output signal. The second fault will result in loss of both validity signals, which may be used by the system logic to reconfigure the system to a passive state. In the autopilot art, an example of a monitored element is an instrument landing system (ILS) receiver with a built-in monitor feature. Receivers of this type are described in two instrument standards published by Aeronautical Radio, Inc. (ARINC): Characteristic No. 547, entitled "Airborne VHF Navigation Receiver," issued Oct. 1, 1961; and Characteristic No. 548, entitled "Altitude Encoder," issued Mar. 1, 1962.

In the case of "unmonitored" elements, that is, elements which are not monitored directly but whose output signals are compared with those of other identical elements to sense failures, a minimum of three each elements are required for fail operational/fail passive capability. Upon occurrence of a first failure of one of three such elements, system logic may select one of the two element output signals which still agree. Upon occurrence of a failure in one of the two remaining elements, the system logic may sense the difference in the element output signals and reconfigure the system to a passive state. An example of an element typically used as an unmonitored element in autopilot systems is a vertical gyro.

The design of a fail operational/fail passive system with a minimum number of components is further complicated by other design goals. It is desirable to have a system which has fail operational/fail passive capability when all its redundant elements are physically present, yet retains fail passive capability when a portion of its redundant elements is physically removed for repair. To accomplish this goal with unmonitored elements, four elements in two groups of two elements each may be utilized. With the system so configured, either group of two elements may be removed for repair. Differences in output signals in the remaining two redundant elements may be used by the system logic to sense first failure, after which the logic may reconfigure the system to a passive state. When all four redundant unmonitored elements are present, the system has more than the number of elements required for fail operational/fail passive capability.

It will not be apparent that practical application of redundancy techniques to develop a control system with fail operational/fail passive capability may involve the use of a different number of redundant elements for one system function than for another. By defining the term "redundancy level" as the number of redundant elements needed to perform a particular system function will fail operational/fail passive capability, this may be referred to as a mixing of redundancy levels.

However, mixing redundancy levels in a control system results in problems which prior art signal selection apparatus is not equipped to handle. Prior art signal selection and monitoring circuits, examples of which are shown in U.S. Pat. Nos. 3,305,735, issued Feb. 21, 1967 to H. Moreines; 3,467,956, issued Sept. 16, 1969 to H. Moreines and 3,289,193, issued Nov. 26, 1966 to R. L. Worthington et al., have been constrained to use of a particular redundancy level throughout a system.

It is therefore a primary object of the present invention to provide fault suppressing signal selection apparatus for use in a control system having mixed redundancy levels, which apparatus has a fail passive capability after failure of a monitored element affecting two channel signals.

Another important object is to provide signal selection apparatus for use in a control system having mixed redundancy levels, which apparatus has a fail passive capability after failure of an unmonitored sensor affecting two channel signals.

Yet another object of the invention is to provide a signal selection apparatus for systems having two computer assemblies, which apparatus gives the system fail operational/fail passive capability when both computer assemblies are physically present, and fail passive capability if one computer assembly is removed.

A further object of the invention is to provide signal selection apparatus which will accept data from a pair of monitored sensors and three unmonitored sensors processed through a four computation channel configuration while retaining fail operational/fail passive capability.

SUMMARY OF THE INVENTION

The objects of the invention are attained in signal selection apparatus for use with a control system having at least three redundant channel signals, the values of at least two these channel signals being affected by one system element. The signal selection apparatus comprises a signal selection element which has a plurality of inputs, each of which receives one of the redundant channel signals and selects a control signal for use in affecting the condition controlled by the system. The signal selection apparatus further comprises switching means which respond to logic signals by substituting a passive signal for at least one of the redundant channel signals affected by the system element. Validity determining means in the apparatus generates the logic signals upon failure of the system element which affects the values of the two channel signals, whereby the apparatus prevents first failure in the system element from resulting in selection of an inaccurate, non-passive signal.

BRIEF DESCRIPTION OF THE DRAWINGS

Other objects and advantages of this invention will become apparent upon a reading of the following detailed description and upon reference to the drawings, in which.

While the invention will be described in connection with a preferred embodiment, it will be understood that the invention is not limited to that embodiment. On the contrary, alternatives, modifications and equivalents included within the spirit and scope of the invention are limited only by the appended claims.

Figure 1:
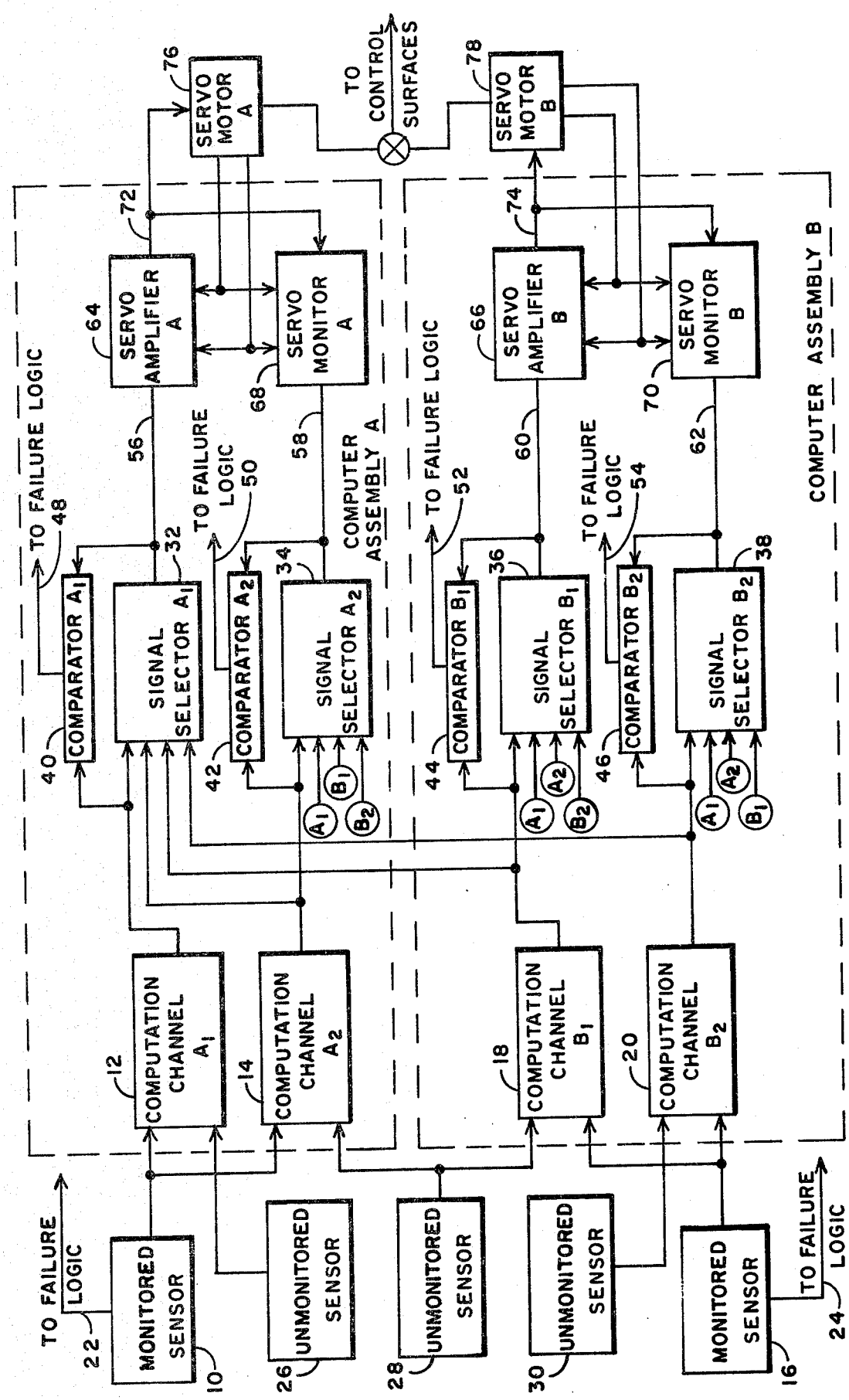
FIG. 1 is a block diagram of a fail operational/fail passive control system using mixed redundancy levels, and is illustrative of an application in which the fault suppressing signal selection apparatus may be used.

A control system illustrating an application of signal selection apparatus, from which the failure logic has been omitted to simplify its descriptions is shown in FIG. 1. The system shown is a fail operational/fail passive system which includes two computer assemblies. The computer assemblies are indicated in the figure by dashed line rectangular blocks labelled Computer Assembly A and Computer Assembly B. To the left of Computer Assembly A is a first monitored element or sensor 10 which senses a condition controlled by the system. Sensor 10 provides an output signal indicative of the sensed condition to each of a pair of computation channels $A_1$ and $A_2$ (identified by reference numerals 12 and 14) in Computer Assembly A. Similarly, a second monitored sensor 16 provides its output signal to two computation channels $B_1$ and $B_2$ (identified by reference numerals 18 and 20). Monitored sensors 10 and 16 both sense the same condition. Therefore, if they are both operating properly, their outputs should be substantially identical. Monitored sensors 10 and 16 each generate a validity signal during proper operation. The validity signals generated by sensors 10 and 16 are presented at validity signal outputs 22 and 24 respectively. The use of these validity signals is further described in the discussion of FIGS. 2 and 3.

The control system of FIG. 1 also contains three unmonitored elements, which in this embodiment are unmonitored sensors denoted by reference numerals 26, 28, and 30. Unmonitored sensor 26 senses a condition and provides an output signal indicative thereof to computation channel 12 in Computer Assembly A. Unmonitored sensor 28 independently senses the same condition and provides its output signal to computation channel 14 and computation channel 18 of Computer Assemblies A and B respectively. As a result, sensor 28 affects the channel signals of both computation channels 14 and 18. The counterpart of unmonitored sensor 26 for Computer Assembly A is unmonitored sensor 30 connected to provide its output signal to computation channel 20 in Computer Assembly B.

The computation channels 12, 14, 18, and 20 provide conventional signal summing, shaping, and scheduling of the sensor output signals to generate control signals of the type and form required to affect the condition controlled by the system. The output from each computation channel is fed as an input signal to one input terminal of each of four signal selectors 32, 34, 36, and 38. The connections providing the computation channel outputs to signal selector 32 are shown. For clarity, the connections to each of the other signal selectors show only the direct connection between the signal selector and its associated computation channel. For example, the connection between computation channel $A_2$ and signal selector $A_2$ is shown. Each of the other inputs to signal selector $A_2$ (34) is represented by a circle and arrow. Inside the circle is a subscripted letter identifying the signal as generated by a particular computation channel. Each of the signal selectors 32, 34, 36, and 38 functions to select a signal of an intermediate level from among the signals supplied to it during normal operation. As shown, each signal selector receives four signals, and either the second most positive or second most negative signal is selected. The signal selectors will be more fully understood by reference to the discussion of FIG. 3, where one of the signal selectors is described in detail.

Comparators 40, 42, 44, and 46 are connected around signal selectors 32, 34, 36, and 38 respectively. Each comparator has two inputs, which are indicated in FIG. 1 by arrows directed towards the comparator block. Provided at one of these inputs is the output signal from its associated signal selector. For example, in the case of the signal selector $A_1$, one input of an associated comparator $A_1$ is connected to receive at one input the output or selected signal from the selector. The other input to comparator $A_1$ receives the output signal of computation channel $A_1$. Comparator $A_1$ senses any difference between the signal from computation channel $A_1$ and the output signal selected by signal selector $A_1$. When this sensed difference reaches a predetermined amount, comparator 40 trips and at a comparator trip output 48, a switching signal is provided.

Three other comparators $A_2$, $B_1$, and $B_2$ (identified by reference numerals 42, 44, and 46 respectively) function in a similar manner, comparing the channel signals from their associated computation channels with the selected output signals from their associated signal selectors. Upon detection of a significant difference between the signals in any of the signal pairs, the associated comparator trips to provide a switching signal at its comparator trip output. The comparator trip outputs for comparators 42, 44, and 46 are labelled 50, 52, and 54 respectively. These switching signals are used in conjunction with failure logic switching of FIG. 2 to suppress faults in the system by actuating switches in each of the four signal selectors 32, 34, 36, and 38.

The selected signals from signal selectors 32, 34, 36, and 38, as well as being provided as one input to the comparators, are transmitted to connecting means 56, 58, 60, and 62 respectively. Connecting means 56 and 60 provide control signals to two servo amplifiers 64 and 66 in Computer Assemblies A and B respectively. The other two connecting means 58 and 62 provide selected signals from signal selectors 34 and 38 to servo monitors A and B (identified by reference numerals 68 and 70 respectively). For example, signal selector 34 provides its selected signal through connecting means 58 to servo monitor 68.

Each servo monitor serves only to check or monitor a servo amplifier and servomotor. During proper operation of the control system, the selected signal received by the servo monitor should be substantially identical to that received by the servo amplifier in the same computer assembly. The servo monitor blocks 68 and 70 are shown with arrows indicating interconnection with the servo amplifiers and servomotors in their respective computer assemblies. These interconnections provide the servo amplifier output signal, servomotor position feedback, and other information necessary for the servo monitors to determine whether or not proper servomotor and servo amplifier operation is occurring. If the servo monitor senses improper operation of its associated servo amplifier or servomotor, it will generate a logic signal used by a portion of the system not shown in FIG. 1 to transfer control to the other computer assembly.

The amplified control signals from servo amplifiers 64 and 66 are provided as control signals at servo amplifier outputs 72 and 74 of Computer Assemblies A and B. Servo amplifier outputs 72 and 74 are each connected to two elements. Output 72 is connected to servo monitor 68 and to a servomotor block 76, respresentative of a servomotor which affects the controlled condition. Similarly, servo amplifier output 74 is connected both to a servomotor 78 and to servo monitor 70.

During normal operation of the control system shown in FIG. 1, that is, during operation when no system faults or failures have occurred, the information from one of the monitored sensors in the system and from one of the unmonitored sensors will be provided for processing by each computation channel. Each of computation channels 12, 14, 18, and 20 will process the sensor information it receives and generate a channel signal which is a candidate for use as a control signal by the system. Each channel signal will be provided, through interconnections, to each of the four signal selectors 32, 34, 36, and 38. Each signal selector will then select an intermediate level signal from the group of four channel signals it receives. The selected signals from signal selectors 32 and 36 will be transmitted to servo amplifiers 64 and 66 respectively. Servo amplifiers 64 and 66 amplify and filter the signals they receive and transmit the amplified and filtered signals to the servomotors 76 and 78 respectively. The servomotors, or one of them, will in response effect a change in the controlled condition. The typical servo feedback loop adjusting the servo amplifier and servo monitor outputs is indicated by appropriate arrows in FIG. 1. Since the understanding of the interaction between the servo monitors, servomotors and servo amplifiers is not necessary to a complete understanding of the present invention, this portion of the system will not be described in detail.

Figure 2:
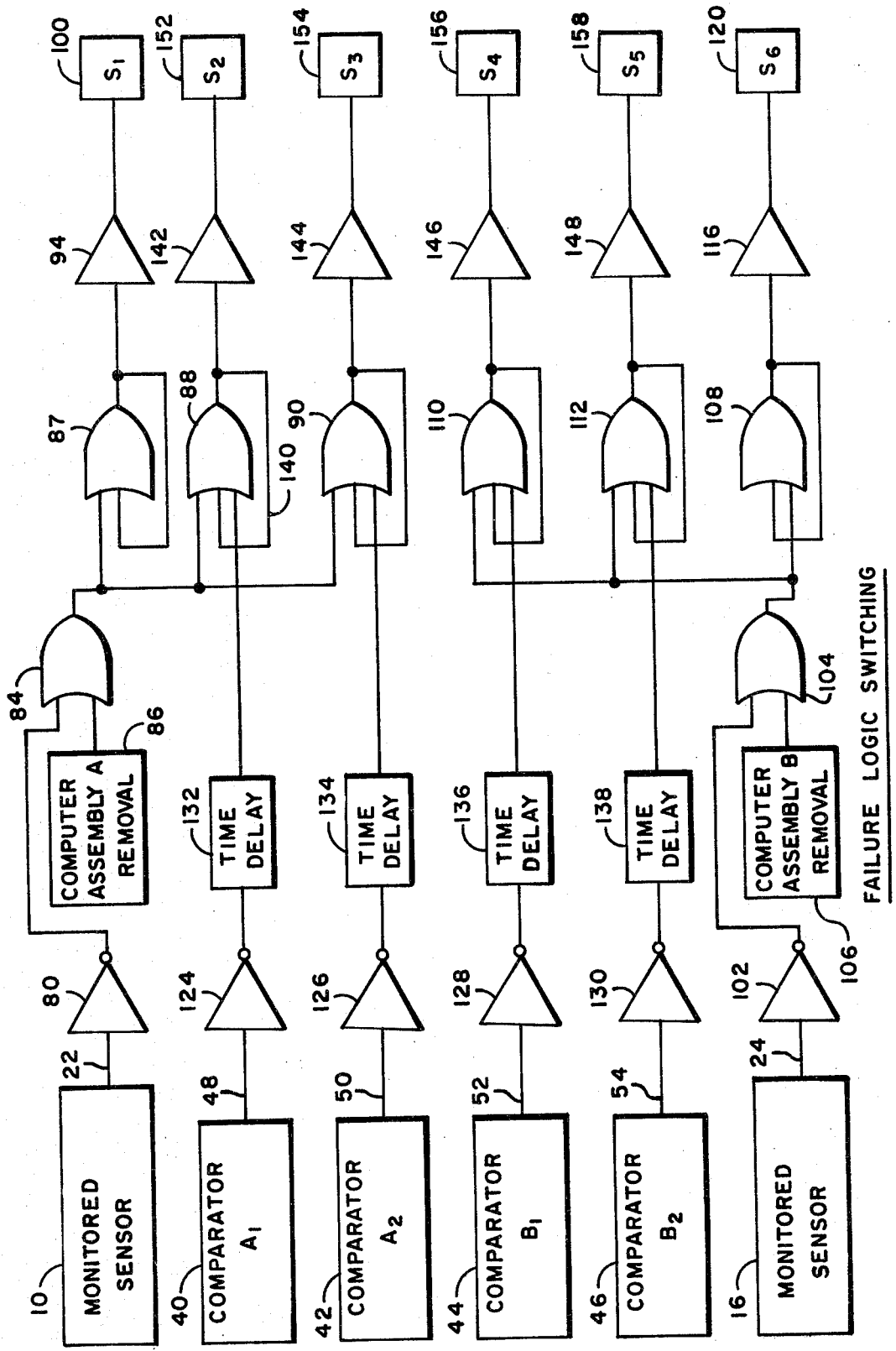
FIG. 2 is a schematic diagram of failure logic switching which cooperates with each signal selector shown in FIG. 1 to achieve fault suppression.
Figure 3:
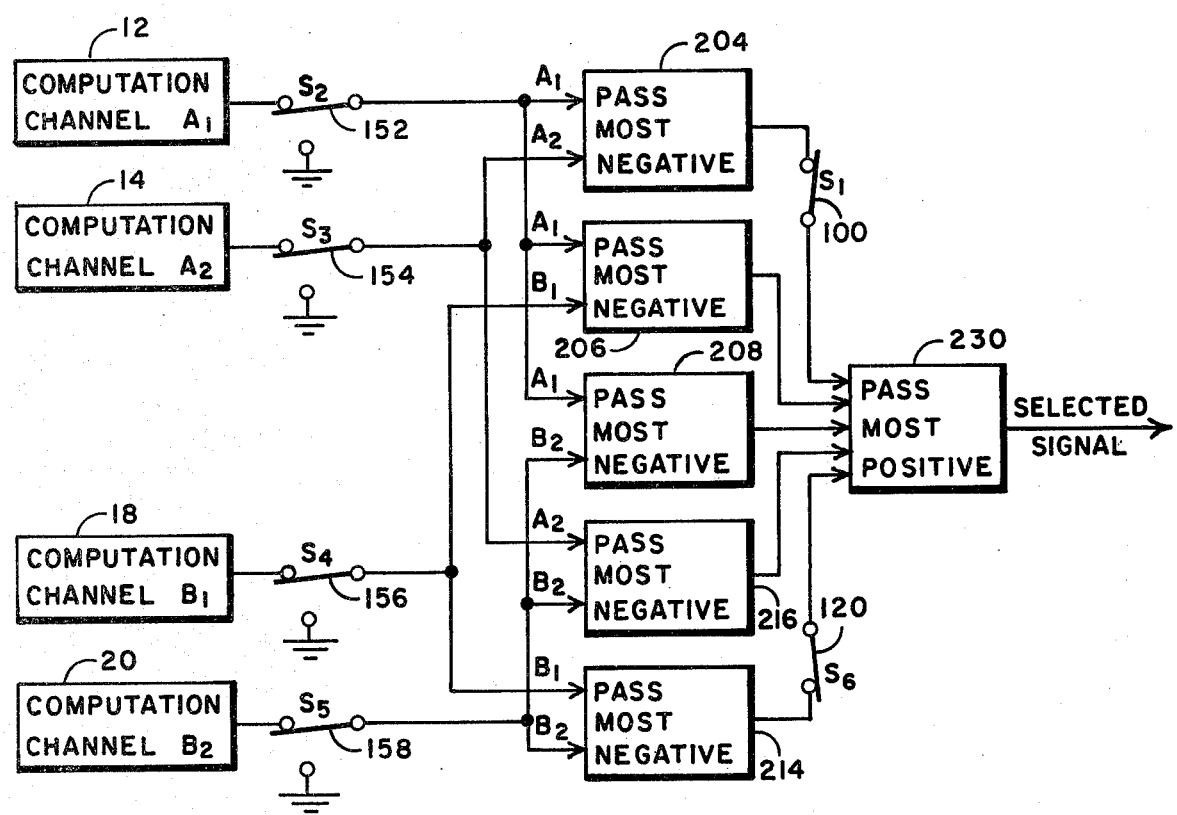
FIG. 3 is a detailed block diagram of one of the four signal selector blocks of FIG. 1 showing the switches which are activated by the failure logic switching of FIG. 2 to achieve fault suppression.

FIG. 2 illustrates the failure logic and associated switches used in accomplishing fault suppression in the signal selectors 32, 34, 36, and 38 shown in the control system of FIG. 1. A set of switches corresponding to the switch blocks $S_1$ through $S_6$ shown in FIG. 2 is contained in each of selectors 32, 34, 36, and 38. Sensors 10 and 16 and comparators 40, 42, 44, and 46 correspond to like identified elements in FIG. 1. The remaining circuitry is not included in FIG. 1. Monitored sensors 10 and 16 and comparators 40, 42, 44, and 46 are included in FIG. 2 only to clearly indicate the origin of the logic signals utilized by the failure logic circuitry of FIG. 2. Blocks $S_1$ through $S_6$, representative of switches in each of the signal selectors, are included to clearly indicate the destination of the switching signals. The precise location of these switches in each signal selector is shown in FIG. 3, which is a detailed block diagram of one of signal selectors 32, 34, 36, or 38. The signal selectors, in combination with the failure logic switching of FIG. 2, function in a unique manner to achieve a fail operational/fail passive capability in the mixed redundancy level control system of FIG. 1. This result is achieved through fault suppression in the signal selectors, which will become apparent from a study of FIGS. 2 and 3.

For the purpose of describing this specific embodiment, it will be assumed that during normal or non-failed operation each of the logic signals at the monitored sensor validity outputs 22 and 24 and at the comparator trip outputs 48, 50, 52, and 54 are in a logic "1" state. This is merely a matter of convention. The system would work equally well for a failure logic switching circuit with normal conditions indicated by logic "0" states.

Validity signal output 22 from monitored sensor 10 is connected to the input of an inverter 80. Inverter 80 functions to invert the signal received at its input and provide the inverted signal at its output. Since the logic signal present at output 22 is normally a logic 1, the signal at the output of inverter 80 is normally a logic 0. The output of inverter 80 is connected to one input of an OR gate 84, the other input of which is connected to a Computer Assembly A removal block 86. Removal block 86 represents a circuit which senses physical removal of Computer Assembly A from the system. The output signal from block 86 is a logic "0" when Computer Assembly A is present, but becomes a logic "1" when Computer Assembly A has been removed. Either removal of Computer Assembly A or loss of the signal indicating validity will therefore generate a logic 1 signal at the output of OR gate 84.

The output of OR gate 84 is connected to a latch 87 and to each of two latching OR gates 88 and 90. Discussion of latching OR gates will be deferred until later in the description of FIG. 2. The latch 87 functions to sustain a logic 1 signal at its output once a logic 1 signal is present at its input. The output of latch 87 is connected to an amplifier driver 94. Amplifier driver 94 filters and amplifies a logic 1 signal so that it may be used to actuate a switch. The output of amplifier driver 94 is connected to a switching block 100. Switching block 100 represents a switch in one of the signal selectors shown in FIG. 1, each of which includes such a switch.

The failure logic connected to validity signal output 24 from monitored sensor 16 is essentially the same as that connected to validity signal output 22. Validity signal output 24 is connected to an inverter 102, which is in turn connected to one input of an OR gate 104. The other input of OR gate 104 is connected to a Computer Assembly B removal block 106. Functioning in much the same way as block 86, block 106 generates a logic 1 whenever Computer Assembly B is physically removed from the system. The output of OR gate 104 is connected as an input to a latch 108 and to two latching OR gates 110 and 112. The output of latch 108 is connected to amplifier driver 116, which in turn provides power for actuating a switch represented by switching block 120.

The remaining switching signals are generated as a result of logic signals from four comparators. Since the circuitry associated with each of these comparators is substantially identical to all others, the entire group shall be described together. Comparator trip outputs 48, 50, 52, and 54 are connected to inputs of inverters 124, 126, 128, and 130 respectively. The inverters 124, 126, 128, and 130 function in essentially the same way as inverters 80 and 102, inverting the logic level of the received signal and transmitting the inverted result.

The outputs of inverters 124, 126, 128, and 130 are connected as inputs to time delay elements 132, 134, 136, and 138 respectively. These time delay elements provide a time delay to prevent nuisance switching. Switching might otherwise be caused by transient disagreements between a selected channel signal and a particular channel signal which result in temporary increases in comparator output not attributable to computation channel failure. Such a transient disagreement might, for example, be due to a power line transient. A typical time constant for these time delay elements might be 100 milliseconds.

The outputs of time delay elements 132, 134, 136, and 138 are connected to inputs of four latching OR gates 88, 90, 110 and 112 respectively. Feedback associated with each OR gate indicates that it is a latching gate. The feedback link for latching OR gate 88 is labelled with reference numeral 140. The other inputs to latching OR gates 88, 90, 110, and 112 are connected to receive signals from either OR gate 84 or OR gate 104, as previously mentioned.

The outputs of latching OR gates 88, 90, 110, and 112 are connected to inputs of amplifier drivers 142, 144, 146, and 148 respectively. Each of the amplifier drivers amplifies and filters the signal it receives so that a signal of sufficient magnitude for switch actuation is produced. The outputs of amplifier drivers 142, 144, 146, and 148 are connected to switching blocks 152, 154, 156, and 158 representing switches in the signal selectors. Switches represented by blocks 152, 154, 156, and 158 are actuated by signals from their respective amplifier drivers.

A brief description of the operation of the failure logic of FIG. 2 will now be presented. Description of the rationale behind this switching will be deferred until FIG. 3 has been described, since the effect of switches $S_1$ through $S_6$ represented by blocks 100, 120, 152, 154, 156, and 158 can best be understood by reference to FIGS. 1, 2, and 3 in combination.

During operation of the control system of FIG. 1, failure of a monitored sensor, for example sensor 10, causes loss of the validity signal usually present at validity signal output 22. Since the normal condition at output 22 is presence of a logic 1, failure will result in substitution of a logic 0. The logic 0 will be inverted to a logic 1 by inverter 80, which will transmit the logic 1 to OR gate 84. OR gate 84 will respond to a logic 1 at one of its inputs, generating a logic 1 at its output. The logic 1 at the output of OR gate 84 will latch the latch 87 and OR gates 88 and 90 so that the output of each will be a logic 1. The logic 1 signal will be amplified by the amplifier drivers and will actuate switches $S_1$, $S_2$, and $S_3$.

It will be readily understood that removal of Computer Assembly A will have an identical effect on the system, since that removal also results in presentation of a logic 1 at OR gate 84. The effect of a malfunction of monitored sensor 16 or removal of Computer Assembly B will have the same effect on the switches shown in the lower half of FIG. 2 as malfunction of sensor 10 or removal of Computer Assembly A had on switches $S_1$, $S_2$, and $S_3$, since the logic structure is identical. Therefore, malfunction of sensor 16 or removal of Computer Assembly B will result in actuation of switches $S_4$, $S_5$, and $S_6$.

The effect of the comparator trip outputs on the switches will now be explained. Assuming, for illustrative purposes, that a failure in computation channel $A_1$ caused a significant change in its channel signal, comparator 40 would sense the difference between that channel signal and the selected signal. At trip output 48, a logic 0 would replace the logic 1 normally present. The logic 0 would be inverted to logic 1 by inverter 124. The presentation of the logic 1 to OR gate 88 would be momentarily delayed by element 132. After the delay, OR gate 88 would latch with a logic 1 output. The logic 1 signal would be transmitted to driver 142. Driver 142 would amplify the signal and use it to actuate switch $S_2$. Tripping of any of the other comparators would result in actuation of one of the other three switches $S_3$, $S_4$, and $S_5$ through an essentially identical operation.

The function of switches $S_1$ through $S_6$ can best be understood by reference to FIG. 3, which shows a signal selector in detail. The signal selector shown is a preferred construction suitable for use in the system of FIG. 1 as signal selector 32, 34, 36, or 38. In the signal selector of FIG. 3, particular computation channels are connected to particular is dictated by the function of switches $S_1$ through $S_6$ in the signal selector, namely the suppression of faults in particular channels by these switches. To illustrate, a malfunction in computation channel $A_1$ may be sensed by comparator $A_1$, which will actuate switch $S_2$ as described in connection with FIG. 2. Actuation of $S_2$ eliminates the channel signal from computation channel $A_1$ as a candidate for selection by the signal selector.

In FIG. 3, a channel signal from computation channel $A_1$ is provided through normally closed switch $S_2$ to each of three first sense pass extreme elements 204, 206, and 208. First sense pass extreme elements 204, 206, and 208 are designated pass most negative elements in FIG. 3. It is not necessary that these elements be pass most negative elements; pass most positive elements would also work. What is essential is that each first sense pass extreme element be capable of selecting, from the signals received at its inputs, the extreme signal with respect to a predetermined sense or polarity. For elements 204, 206, and 208 the sense is negative. They therefore select and provide at an output, the most negative of the signals each receives. Elements 204, 206, and 208 are two input negative sense pass extreme elements.

Like the channel signal from computation channel $A_1$, the channel signal from computation channel $B_2$ is provided through a normally closed switch $S_5$ to inputs of each of three first sense pass extreme elements 208, 214, and 216. First sense pass extreme elements 214 and 216 function in the same fashion as elements 204, 206, and 208 previously described, selecting the most negative signals received at their inputs and providing the selected signals at their outputs.

The signal selector of FIG. 3 also accepts two other computation channel signals, the signals from computation channels $A_2$ and $B_1$. Computation channel $A_2$ is connected through normally closed switch $S_3$ to one input of each of first sense pass extreme elements 204 and 216. Computation channel $B_1$ is connected through normally closed switch $S_4$ to inputs of first sense pass extreme elements 206 and 214. The five first sense pass extreme elements 204, 206, 208, 214, and 216 receive at their inputs five distinct subsets of two channel signals each. These are "distinct subsets of two" in that no pair of channel signals provided to inputs of any one of the first sense pass extreme elements is identical to any other pair so provided. On the other hand, one of the possible distinct subsets of two channel signals from the group of signals available is not provided at the inputs of a first sense pass extreme element. This subset is made up of the channel signals from computation channels $A_2$ and $B_1$. The rationale behind exclusion of this subset will become clear upon reference to the description of FIG. 4 appearing below.

The outputs of each of first sense pass extreme elements 204, 206, 208, 214, and 216 are connected to inputs of a second sense pass extreme element 230. The output of first sense pass extreme element 204, an element which receives channel signals from the two computation channels in Computer Assembly A, is connected to an input of second sense, pass extreme element 230 through a normally closed switch $S_1$. Similarly, the output from first sense pass extreme element 214, an element which receives channel signals from the two computation channels in Computer Assembly B, is connected to an input of second sense pass extreme element 230 through a normally closed switch $S_6$. The remaining three first sense pass extreme elements 206, 208, and 216 receive pairs of signals consisting of one signal from each of the Computer Assemblies. The outputs of these three elements are connected directly to inputs of second sense pass extreme element 230.

Second sense pass extreme element 230 selects the extreme signal from among the signlas it receives at its input, the extreme signal selected being defined with respect to a second sense opposite the sense of the first sense pass extreme elements. Since the first sense pass extreme elements in FIG. 3 are pass most negative elements, the second sense pass extreme element 230 is a pass most positive element. Second sense pass extreme element 230 therefore selects the most positive of the signals received at its inputs and transmits that signal at its output. The output of element 230 is the signal selected by the signal selector. In the four signal selectors 32, 34, 36 and 38 of FIG. 1, the selected signals would be transmitted via connecting means 56, 58, 60, and 62 to other portions of the control system.

Figure 4:
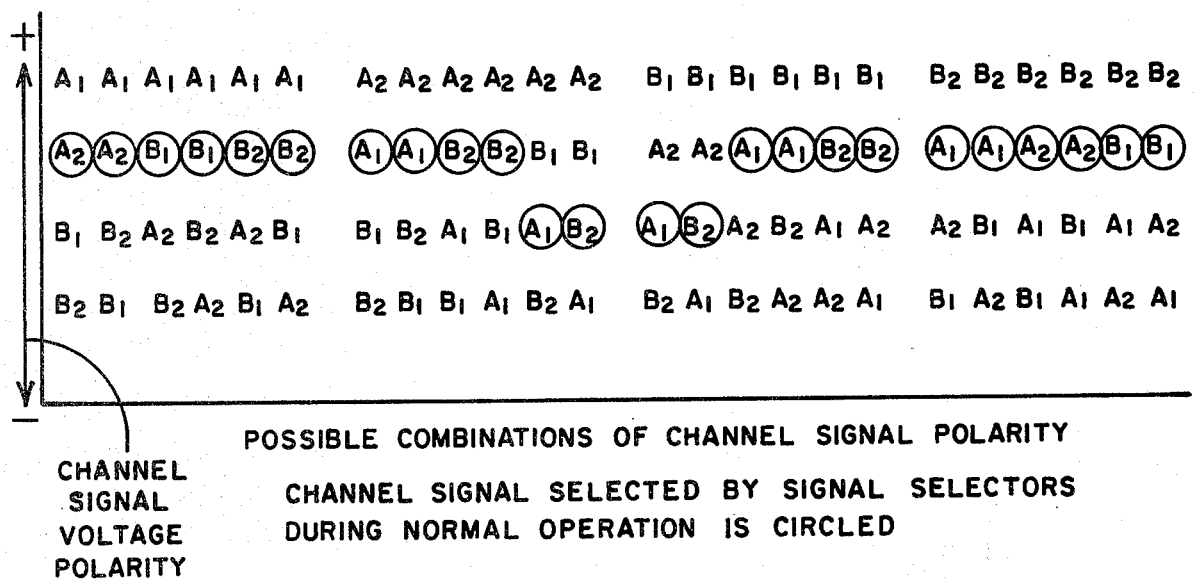
FIG. 4 is a table showing the selected signal for various signal polarity combinations of the computation channel signals when all switches are in the states shown in FIG. 3; and, FIG. 5A-5F are a set of six illustrative time histories of system operation which may be used to explain the response of the fault suppressing signal selection apparatus to a number of system faults.

Operation of the signal selector of FIG. 3 will be best understood by referring to FIG. 4 which shows a table of possible polarity combinations of the computation channel signal and the selected signal for each combination. This table covers all situations in which no failure has been detected and none of the six switches shown in FIGS. 2 and 3 has opened.

There are 24 possible combinations of channel signal voltage polarity. For 20 of these 24 combinations, the second most positive signal will be selected. For the other four combinations, the third most positive will be selected. In every case the signal selector is a means for selecting an intermediate value signal from the channel signals it receives. In these situations, the group including all first sense pass extreme elements, being pass most negative elements, will eliminate the most positive signal from the group. The second sense pass extreme element being a pass most positive element, will then choose the most positive of the signals remaining, which will be the second most positive signal.

The second most positive signal will not be selected in those situations where the channel signals from computation channels $A_2$ and $B_1$ are the two most positive signals. The reason for this is that the signal selector of FIG. 3 contains no pass most negative element which receives as inputs the distinct subset of signals made up of computation channel signals $A_2$ and $B_1$. As a result, when the signals from channels $A_2$ and $B_1$ are more positive than the others they are both eliminated at the first sense pass extreme elements.

This feature is necessary to provide fail operational/fail passive capability in the system of FIG. 1. As shown in FIG. 1, one of the sensor output signals affecting the channel signals of computation channels $A_2$ and $B_1$ is provided by unmonitored sensor 28. In the event of malfunction of unmonitored sensor 28, the channel signals of computation channels $A_2$ and $B_1$ would both be affected. In some situations, the malfunction would cause these channel signals to assume values more positive than the sensed conditions would warrant. In these situations, if a pass most negative element receiving these channel signals as inputs were present, one of the signals from a malfunctioning channel would be selected. Since this would result in control system malfunction after first failure, the system would not achieve fail operational/fail passive capability. By pairing the received channel signals in all possible distinct subsets of two, with the exception of the subset comprised of the signals from channels $A_2$ and $B_1$, the signal selection apparatus of FIG. 3 solves this problem. The combinations of channel signal polarity affected by this structure are the four combinations shown in FIG. 4 in which the third most positive signal is selected.

The switches in the signal selector shown in FIG. 3 and the associated failure logic switching circuitry of FIG. 2 comprise the switching necessary to suppress faults at the signal selector as failures occur and are detected. This fault suppression is accomplished by switching between the computation channels and the inputs to the first sense pass extreme elements; and between first and second sense pass extreme elements.

As previously discussed, loss of the validity signal at sensor validity output 22 or physical removal of Computer Assembly A from the control system will result in actuation of switches $S_1$, $S_2$, and $S_3$ in each of the signal selectors present in the system. The reason for this actuation of switch $S_1$ in each signal selector is apparent from reference to FIG. 1. Monitored sensor 10 provides a sensor signal to each of the two computation channels $A_1$ and $A_2$. For this reason, if sensor 10 malfunctions, the signal selectors should suppress selection of a channel signal from either of these computation channels.

Switches $S_2$ and $S_3$ are also actuated by physical removal of Computer Assembly A or loss of validity signal at validity output 22. The actuation of these switches results in the substitution of a passive signal for each of the channel signals from computation channels $A_1$ and $A_2$. For a control system of the type shown in FIG. 1, grounding is equivalent to "substitution of a passive signal," since the channel signal information in the control system of FIG. 1 is carried by the amplitude or voltage level of the signal.

If passive signals were not substituted for the channel signals of computation channels $A_1$ and $A_2$ upon malfunction of monitored sensor 10, the system would not have fail opertional/fail passive capability. To illustrate this, assume a situation in which a first failure of sensor 10 causes the channel signals from channels $A_1$ and $A_2$ to assume erroneously large positive values, and a second failure then occurs in computation channel $B_1$, causing the $B_1$ channel signal to assume an even greater positive value. Further assume that these differences are not initially sufficiently large to trip the comparators. If switches $S_2$ and $S_3$ were not actuated, the erroneous signal from channel $A_1$ would be selected by pass most negative element 206 and by pass most positive element 230. The system would not be fail passive for second failures. The substitution of passive signals for computation channel signals affected by a failed monitored sensor clearly insures fail passive capability after second failures.

It will be apparent that a malfunction of monitored sensor 16 reflected in a change in logic signal at validity signal output 24, will cause actuation of switches $S_4$, $S_5$, and $S_6$, since the structure of the failure logic in the lower half of FIG. 2 is symmetrical with that in the upper half. Under these circumstances, switch $S_6$ performs a function analogous to that of switch $S_1$, preventing the signal selected by the element 214 (which receives the two channel signals affected by sensor 16) from reaching element 230. At the same time switches $S_4$ and $S_5$ perform functions analogous to switches $S_2$ and $S_3$ in the previous example, substituting a passive signal for the two channel signals ($B_1$ and $B_2$) affected by sensor 16. This prepares the system for second failure.

If one of the two computer assemblies is removed, for example, Computer Assembly A, a change in the signal selector identical to that which occurs upon malfunction of a monitored sensor is desirable. Upon removal of Computer Assembly A, its channel signals must no longer be selected. Switch $S_1$ will prevent the signals on the disconnected channels from reaching element 230 as a result of comparison of these signals with each other. Switches $S_2$ and $S_3$ will ground the inputs to the selector, removing any possible noise appearing at the points of disconnection of the channels. As a result of the actuation of switches $S_1$, $S_2$, and $S_3$ if the channel signals $B_1$ and $B_2$ are negative with respect to ground, none of the grounded signals will be selected by the first sense pass extreme elements, since channel signals $A_1$ or $A_2$ appear at these elements only when paired with channel signals $B_1$ or $B_2$. On the other hand, if channel signals $B_1$ and $B_2$ are positive with respect to ground, one of the two will be selected by element 214, while elements 206, 208, and 216 will select channel signals $A_1$, $A_1$ and $A_2$ respectively. At second sense pass extreme element 230, the signal from element 214 will be selected, since the most positive signal is selected by element 230.

One might conclude after brief inspection of FIG. 2 that switches $S_1$ and $S_6$ are not required for fail operational/fail passive capability in the control system of FIG. 1, since malfunction of sensor 10 or 16 grounds the inputs to the signal selector which normally receive the signals from computation channels affected by the failed sensor. The need for these switches may be understood by assuming a failure in monitored sensor 10 at a time when the channel signals in computation channels unaffected by sensor 10 ($B_1$ and $B_2$) are negative-going signals. If switches $S_2$ and $S_3$ were the only switches actuated by the failure, the five first sense pass extreme elements 204, 206, 208, 216 and 214 would select and transmit ground, channel signal $B_1$, channel signal $B_2$, channel signal $B_2$, and channel signal $B_1$ or $B_2$ respectively. Since element 230 is a pass most positive element and channel signals $B_1$ and $B_2$ are negative, element 230 would select the signal transmitted from element 204, that is, a ground level signal. Therefore, the system would not be fail operational after first failure. The actuation of switch $S_1$ in the present system deals with this situation by disconnecting the signal selected by element 204 from element 230 in each of the signal selectors of FIG. 1.

Four of the switches in each signal selector may be actuated by signals other than output validity signals or computer assembly removal signals. These are switches $S_2$, $S_3$, $S_4$, and $S_5$, each of which may be actuated by an associated comparator. Since the operation is identical for each of the four switches, switch $S_2$ and its associated comparator $A_1$ will be used as an illustrative example. Assume that a malfunction occurs in computation channel $A_1$, and that the malfunction causes the channel signal from channel $A_1$ to diverge from the values of the other channel signals. FIG. 4 shows that either the second most positive or second most negative signal is selected by the signal selector. Therefore, whether channel signal $A_1$ diverges positively or negatively from the group, it will not be selected by signal selector 32 of FIG. 1. Comparator 40 receives as inputs the signal selected by selector 32 and channel signal $A_1$. When the difference between channel signal $A_1$ and the selected signal exceeds a predetermined amount, comparator 40 will trip, generating a logic 0 at trip output 48. In the failure logic of FIG. 2, this logic 0 will be inverted to logic 1 by inverter 124. After a time delay caused by element 132, the logic 1 will latch OR gate 88. The logic 1 will then be used to actuate switch 152, as shown in FIG. 3, in each of signal selectors 32, 34, 36, and 38. Switch 152 substitutes a passive signal for channel signal $A_1$ at all signal selector inputs. This does not affect the control signal until a second failure occurs, but enables the system to "fail passive" upon occurrence of a second failure.

It should be re-emphasized that, in discussing the fault suppressing switches shown in FIGS. 3 and applying the discussion to FIG. 1, each switch in FIG. 3 corresponds to four switches in FIG. 1. One switch corresponding to each switch shown in FIG. 3 is included in each of the signal detectors 32, 34, 36, and 38 shown in FIG. 1. Also the relationship between computation channels and fault suppressing switches shown in FIG. 3 must be maintained in each signal selector in FIG. 1 if the FIG. 1 control system is to work properly. As an example, the channel $A_1$ failure discussed in the preceding paragraph must result in substitution of a passive signal at the inputs to each of signal selectors 32, 34, 36, and 38 where channel signal $A_1$ is present during nonfailed operation.

A number of examples of first and second failure responses will now be used to illustrate the operation of the signal selectors of FIG. 1. The function of the signal selector after second failure is to suppress the faults at the signal selectors until system disengage logic (not shown) disconnects the system from control of the controlled condition.

The six diagrams of FIG. 5 show illustrative time histories of the four computation channel signal voltages. The signals not selected by the signal selectors are shown by dotted lines and the signal selected by the signal selectors is shown as a solid line. Each input voltage is shown as having a sinusoidal form to illustrate signal selector action as the signals vary from positive to negative polarity.

In FIG. 5A a single failure in computation channel $A_1$ has been detected by comparator $A_1$. Switch $S_2$ has grounded the inputs to the signal selectors which normally receive channel signal $A_1$. The channel signal $A_1$ is shown at close to zero voltage to represent the grounding. The channel signals from computation channels $A_2$, $B_1$ and $B_2$ are shown significantly separated in value to illustrate the selection process; however, in actual use some form of low authority, channel equalization circuitry (not shown) would probably be used with the system and the variations between nonfailed channel signals would be small. In this first failure situation, the signal selectors behave just as they did prior to grounding of channel $A_1$, the second most positive signal being selected. In FIG. 5A the selected signal is channel signal $B_1$ for positive going signals and channel signal $A_2$ for negative going signals. This illustrates the fail operational capability of the system after first failure.

FIG. 5B illustrates circumstances in which monitored sensor 10 has failed and $S_1$, $S_2$, and $S_3$ in each signal selector have been actuated. Again normal action after the first failure is considered. For positive polarity signals, the second most positive signal is selected and for the negative polarity signals, the second most negative signal is selected. It should be noted that if $S_1$, which al- lows the signal selectors to ignore the signal from extreme selector element 204 in FIG. 3, were absent, the signal selectors would select the failed channel signal $A_2$ for the negative polarity case shown, since $A_2$ is the second most positive signal. It should also be noted here that the configuration of FIG. 5B is also the switching configuration applicable if Computer Assembly A has been removed and computation channels $A_1$ and $A_2$ are missing.

FIG. 5C illustrates a first failure situation identical to that shown in FIG. 5A, with the addition of a second failure in which a positive hardover condition of the signal on computation channel $B_1$ occurs. As the voltage of channel $B_1$ crosses through the level of channel $B_2$, the signal selector changes its output to channel signal $B_2$, so that normal signal will be selected while channel signals $B_1$ and $B_2$ are positive signals. When the nonfailed signals are negative in value, passive channel signal $A_1$, being second most positive, will be selected. The system thus suppresses faults after second failure by selecting a nonfailed or passive signal for control until disengagement occurs.

FIG. 5D illustrates a first failure identical to FIG. 5B except that channel signal $B_1$ is in a positive hardover condition after second failure. In this example, the signal selected is identical in form to that selected in FIG. 5C. If a positive nonfailed signal exists, it will be selected by each signal selector. If the nonfailed signal is negative, a passive signal will be selected.

FIG. 5E is again identical to FIG. 5A except that a failure in channel $B_1$ causes channel signal $B_1$ to fail to zero as the second failure. As channel signal $B_1$ crosses through the level of channel $A_2$ moving towards zero, the signal selectors select $A_2$, a nonfailed signal. For negative going nonfailed signals a passive signal is selected.

FIG. 5F illustrates the same case as FIG. 5D except that channel signal $B_1$ approaches zero after second failure. In this case, passive signals are selected for both positive and negative excursions of nonfailed channel signal $B_2$, since passive signals have been substituted for three of the four channel signals, and the second most positive or second most negative is always selected.

A very great number of first and second failure sequences are possible considering all the available combinations of channel failures, but the fail operational/fail passive capability of the system is maintained in each sequence by using the applicants' unique fault suppressing signal selection apparatus.

While the invention has been described in conjunction with specific embodiments, it is evident that many alternatives and modifications will be apparent to those skilled in the art in light of the foregoing description. It is the applicants' intent to embrace all such alternatives, modifications and variations as fall within this spirit and broad scope of the appended claims.

What is claimed is:

1. Signal selection apparatus for use with a control system having at least three redundant channel signals comprising:

a signal selector means, having a plurality of inputs each for receiving a separate one of said channel signals, said signal selector means for selecting an intermediate value signal from the channel signals received;

comparator means, having two inputs, for comparing signals received at its inputs and generating a switching signal when the received signals differ by a predetermined amount;

connective means for providing said selected intermediate value signal and a first redundant channel signal at the comparator means inputs; and, means responsive to said switching signal for substituting a passive signal at the signal selector means input which receives said first redundant channel signal.

2. The apparatus of claim 1 wherein a time delay element is connected between said comparator means and said means responsive to said switching signal, to introduce a time delay between comparison of the received signals and substitution of a passive signal, whereby nuisance switching due to transients in said first redundant channel signal is lessened.

3. Fault suppressing signal selection apparatus, for use in a control system having a plurality of redundant channel signals, a first pair of which is affected by a monitored element which generates a validity signal during proper operation, said signal selection apparatus comprising:

a plurality of first sense pass extreme elements, each of which has two inputs and an output, each operable to select from the signals present at its inputs the extreme signal defined with respect to one sense and to provide said extreme signal at its output;

means for providing said redundant channel signals to the inputs of said first sense pass extreme elements so that all first sense pass extreme elements receive a distinct pair of channel signals, one of said first sense pass extreme element receiving said first pair;

a second sense pass extreme element, connected to receive the extreme signals at the outputs of said first sense pass extreme elements and operable to select from the received signals the extreme signal defined with respect to a sense opposite that of the first sense pass extreme element for use as a control signal and for said control system;

first switching means, responsive to absence of said validity signal, for disconnecting the output of the first sense pass extreme element which receives said first pair of channel signals from the second sense pass extreme element; and, second switching means, responsive to absence of said validity signal, for substituting a passive signal for each of said first pair of channel signals at each first sense pass extreme element input to which one of said first pair was provided.

4. The apparatus of claim 3 in combination with:

a comparator, connected to receive the signal selected by the second sense, pass extreme element and one redundant channel signal, which comparator generates switching signal in the event that the difference between the signals the comparator receives exceeds a predetermined amount; and, third switching means responsive to said switching signal to substitute, at the inputs to said first sense pass extreme elements, a passive signal for the said one redundant channel signal.

5. Signal selection apparatus for a control system having four channel signals, with a first pair of channel signals affected by a monitored sensor, and a second pair of channel signals affected by an unmonitored sensor, said selection apparatus comprising:

four input terminals to each of which a separate channel signal is supplied;

first selector means for accepting pairs of channels signals, selecting the extreme signal of each pair with respect to a first polarity, and providing the selected signals as output signals;

means for interconnecting the input terminals to said first selector means in pairs so that each channel signal at an input terminal is present in at least two of the pairs of channel signals at the first selector means;

second selector means for accepting a plurality of input signals, selecting the extreme signal with respect to a second polarity, and providing the signal selected by said second selector means for use as a control signal;

means for supplying the output signals from said first selector means as input signals to said second selector means;

output validity logic responsive to failure of said monitored sensor to generate a logic signal when such failure occurs; and, switching means associated with the output validity logic and responsive to the logic signal therefrom to ground the two input terminals to which said first pair of channel signals is supplied.

6. The apparatus as defined by claim 5 wherein said first selector means is configured to receive not more than five pairs of channel signals, and said means for interconnecting connects the input terminals to said first selector means so that, with the exception of the subset comprised of said second pair of channel signals, the channel signals present at the input terminals are paired at the first selector means in all possible distinct subsets of two.

7. The apparatus as defined by claim 5 wherein a first pair of input terminals is supplied with said second pair of channel signals, and said first pair of the input terminals is interconnected with said first selector means so that each of the signals supplied to said first pair of the input terminals is paired only with signals supplied to the remaining input terminals not included in said first pair.

8. A method of selecting an intermediate signal from a set of at least three input signals in a system in which at least a first pair of the input signals has values affected by a monitored sensor which generates a validity signal during proper operation, comprising the steps of:

pairing the input signals in distinct subsets of two, with one subset being comprised of said first pair;

selecting from each subset the extreme signal defined with respect to a first polarity, so that a plurality of signals are selected;

detecting the presence or absence of said validity signal;

removing from said plurality of selected signals the signal selected from the subset comprised of said first pair in the event that absence of said validity signal is detected;

substituting passive input signals into the set for each of said first pair in the event that absence of said validity signal is detected; and, selecting from the remaining selected signals the extreme signal defined with respect to a second polarity opposite said first polarity.

* * * * *